(12) United States Patent
Duboust et al.

(10) Patent No.: US 7,303,462 B2
(45) Date of Patent: Dec. 4, 2007

(54) EDGE BEAD REMOVAL BY AN ELECTRO POLISHING PROCESS

(75) Inventors: Alain Duboust, Sunnyvale, CA (US); Antoine P. Manens, Mountain View, CA (US); Liang-Yuh Chen, Foster City, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 11/087,878

(22) Filed: Mar. 22, 2005

(65) Prior Publication Data

US 2005/0161341 A1 Jul. 28, 2005

Related U.S. Application Data

(63) Continuation-in-part of application No. 10/727,724, filed on Dec. 3, 2003, now Pat. No. 7,077,721, which is a continuation-in-part of application No. 10/642,128, filed on Aug. 15, 2003, now Pat. No. 6,962,524, which is a continuation-in-part of application No. 10/608,513, filed on Jun. 26, 2003, and a continuation-in-part of application No. 10/391,324, filed on Mar. 18, 2003, and a continuation-in-part of application No. 10/244,697, filed on Sep. 16, 2002, now Pat. No. 6,991,526, which is a continuation-in-part of application No. 10/244,688, filed on Sep. 16, 2002, now Pat. No. 6,848,970, and a continuation-in-part of application No. 10/211,626, filed on Aug. 2, 2002, and a continuation-in-part of application No. 10/210,972, filed on Aug. 2, 2002, and a continuation-in-part of application No. 10/151,538, filed on May 16, 2002, now abandoned, which is a continuation-in-part of application No. 10/140,010, filed on May 7, 2002, now Pat. No. 6,979,248, which is a continuation-in-part of application No. 10/033,732, filed on Dec. 27, 2001, now Pat. No. 7,066,800, which is a continuation-in-part of application No. 09/505,899, filed on Feb. 17, 2000, now Pat. No. 6,537,144.

(60) Provisional application No. 60/579,098, filed on Jun. 11, 2004.

(51) Int. Cl.
*B24B 1/00* (2006.01)
*B23H 3/00* (2006.01)
*C25D 17/00* (2006.01)

(52) U.S. Cl. .................. 451/41; 451/57; 451/287; 156/345.28; 204/224 M; 205/642; 205/662; 205/663

(58) Field of Classification Search .............. 451/41, 451/57, 285, 287, 288; 156/345.12, 345.28; 438/691, 692, 693; 205/640–644, 662, 663; 204/199, 224 M, 224 R, 230.2; 257/E21.175, 257/E21.303, E21.31
See application file for complete search history.

(56) References Cited

U.S. PATENT DOCUMENTS

| | | |
|---|---|---|
| 1,601,642 A | 9/1926 | Parker |
| 1,927,162 A | 9/1933 | Fiedler et al. |
| 2,112,691 A | 3/1938 | Crowder |
| 2,240,265 A | 4/1941 | Nachtman |
| 2,392,687 A | 1/1946 | Nachtman |
| 2,431,065 A | 11/1947 | Miller |
| 2,451,341 A | 10/1948 | Jernstedt |
| 2,453,481 A | 11/1948 | Wilson |
| 2,454,935 A | 11/1948 | Miller |
| 2,456,185 A | 12/1948 | Grube |
| 2,457,510 A | 12/1948 | van Omum |
| 2,458,676 A | 1/1949 | Brenner et al. |
| 2,461,556 A | 2/1949 | Lorig |
| 2,473,290 A | 6/1949 | Millard |
| 2,477,808 A | 8/1949 | Jones |
| 2,479,323 A | 8/1949 | Davis |
| 2,480,022 A | 8/1949 | Hogaboom |
| 2,490,055 A | 12/1949 | Hoff |
| 2,495,695 A | 1/1950 | Camin et al. |
| 2,500,205 A | 3/1950 | Schaefer |
| 2,500,206 A | 3/1950 | Schaefer et al. |
| 2,503,863 A | 4/1950 | Bart |
| 2,506,794 A | 5/1950 | Kennedy et al. |

| Patent No. | Date | Inventor |
|---|---|---|
| 2,509,304 A | 5/1950 | Klein |
| 2,512,328 A | 6/1950 | Hays |
| 2,517,907 A | 8/1950 | Mikulas |
| 2,519,945 A | 8/1950 | Twele et al. |
| 2,530,677 A | 11/1950 | Berkenkotter et al. |
| 2,535,966 A | 12/1950 | Teplitz |
| 2,536,912 A | 1/1951 | Cobertt |
| 2,539,898 A | 1/1951 | Davis |
| 2,540,175 A | 2/1951 | Rosenqvist |
| 2,544,510 A | 3/1951 | Prahl |
| 2,549,678 A | 4/1951 | Flandt |
| 2,544,943 A | 5/1951 | Farmer |
| 2,556,017 A | 6/1951 | Vonada |
| 2,560,534 A | 7/1951 | Adler |
| 2,560,966 A | 7/1951 | Lee |
| 2,569,577 A | 10/1951 | Reading |
| 2,569,578 A | 10/1951 | Rieger |
| 2,571,709 A | 10/1951 | Gray |
| 2,576,074 A | 11/1951 | Nachtman |
| 2,587,630 A | 3/1952 | Konrad et al. |
| 2,619,454 A | 11/1952 | Zapponi |
| 2,633,452 A | 3/1953 | Hogaboom, Jr. et al. |
| 2,646,398 A | 7/1953 | Henderson |
| 2,656,283 A | 10/1953 | Fink et al. |
| 2,657,177 A | 10/1953 | Rendel |
| 2,658,264 A | 10/1953 | Toulmin |
| 2,657,457 A | 11/1953 | Toulmin |
| 2,673,838 A | 3/1954 | Vonada |
| 2,674,550 A | 4/1954 | Dunlevy et al. |
| 2,675,348 A | 4/1954 | Greenspan |
| 2,680,710 A | 6/1954 | Kenmore et al. |
| 2,684,939 A | 7/1954 | Geese |
| 2,696,859 A | 8/1954 | Gray et al. |
| 2,689,215 A | 9/1954 | Bart |
| 2,695,269 A | 11/1954 | de Witz et al. |
| 2,698,832 A | 1/1955 | Swanson |
| 2,706,173 A | 4/1955 | Wells et al. |
| 2,706,175 A | 4/1955 | Licharz |
| 2,708,445 A | 5/1955 | Manson et al. |
| 2,710,834 A | 6/1955 | Vrilakas |
| 2,711,993 A | 6/1955 | Lyon |
| 3,162,588 A | 12/1964 | Bell |
| 3,334,041 A | 8/1967 | Dyer et al. |
| 3,433,730 A | 3/1969 | Kennedy et al. |
| 3,448,023 A | 6/1969 | Bell |
| 3,476,677 A | 11/1969 | Corley et al. |
| 3,607,707 A | 9/1971 | Chenevier |
| 3,873,512 A | 3/1975 | Latanision |
| 3,942,959 A | 3/1976 | Markoo et al. |
| 3,992,178 A | 11/1976 | Markoo et al. |
| 4,047,902 A | 9/1977 | Wiand |
| 4,082,638 A | 4/1978 | Jumer |
| 4,119,515 A | 10/1978 | Costakis |
| 4,125,444 A | 11/1978 | Inoue |
| 4,312,716 A | 1/1982 | Maschler et al. |
| 4,523,411 A | 6/1985 | Freerks |
| 4,704,511 A | 11/1987 | Miyano |
| 4,713,149 A | 12/1987 | Hoshino |
| 4,752,371 A | 6/1988 | Kreisel et al. |
| 4,772,361 A | 9/1988 | Dorsett et al. |
| 4,793,895 A | 12/1988 | Kaanta et al. |
| 4,839,993 A | 6/1989 | Masuko et al. |
| 4,934,102 A | 6/1990 | Leach et al. |
| 4,954,141 A | 9/1990 | Takiyama et al. |
| 4,956,056 A | 9/1990 | Zubatova et al. |
| 5,011,510 A | 4/1991 | Hayakawa et al. |
| 5,061,294 A | 10/1991 | Harmer et al. |
| 5,066,370 A | 11/1991 | Andreshak et al. |
| 5,096,550 A | 3/1992 | Mayer et al. |
| 5,108,463 A | 4/1992 | Buchanan |
| 5,136,817 A | 8/1992 | Tabata et al. |
| 5,137,542 A | 8/1992 | Buchanan et al. |
| 5,203,884 A | 4/1993 | Buchanan et al. |
| 5,217,586 A | 6/1993 | Datta et al. |
| 5,225,034 A | 7/1993 | Yu et al. |
| 5,257,478 A | 11/1993 | Hyde et al. |
| 5,328,716 A | 7/1994 | Buchanan |
| 5,478,435 A | 12/1995 | Murphy et al. |
| 5,534,106 A | 7/1996 | Cote et al. |
| 5,543,032 A | 8/1996 | Datta et al. |
| 5,560,753 A | 10/1996 | Schnabel et al. |
| 5,562,529 A | 10/1996 | Kishii et al. |
| 5,567,300 A | 10/1996 | Datta et al. |
| 5,575,706 A | 11/1996 | Tsai et al. |
| 5,578,362 A | 11/1996 | Reinhardt et al. |
| 5,624,300 A | 4/1997 | Kishii et al. |
| 5,633,068 A | 5/1997 | Ryoke et al. |
| 5,637,031 A | 6/1997 | Chen |
| 5,654,078 A | 8/1997 | Ferronato |
| 5,702,811 A | 12/1997 | Ho et al. |
| 5,738,574 A | 4/1998 | Tolles et al. |
| 5,804,507 A | 9/1998 | Perlov et al. |
| 5,807,165 A | 9/1998 | Uzoh et al. |
| 5,823,854 A | 10/1998 | Chen |
| 5,840,190 A | 11/1998 | Scholander et al. |
| 5,840,629 A | 11/1998 | Carpio |
| 5,846,882 A | 12/1998 | Birang |
| 5,871,392 A | 2/1999 | Meikle et al. |
| 5,882,491 A | 3/1999 | Wardle |
| 5,893,796 A | 4/1999 | Birang et al. |
| 5,911,619 A | 6/1999 | Uzoh et al. |
| 5,931,719 A | 8/1999 | Nagahara |
| 5,938,801 A | 8/1999 | Robinson |
| 5,948,697 A | 9/1999 | Hata |
| 5,985,093 A | 11/1999 | Chen |
| 6,001,008 A | 12/1999 | Fujimori et al. |
| 6,004,880 A | 12/1999 | Liu et al. |
| 6,010,395 A | 1/2000 | Nakajima |
| 6,017,265 A | 1/2000 | Cook et al. |
| 6,020,264 A | 2/2000 | Lustig et al. |
| 6,024,630 A | 2/2000 | Shendon et al. |
| 6,033,293 A | 3/2000 | Crevasse et al. |
| 6,056,851 A | 5/2000 | Hsieh et al. |
| 6,066,030 A | 5/2000 | Uzoh |
| 6,074,284 A | 6/2000 | Tani et al. |
| 6,077,337 A | 6/2000 | Lee |
| 6,090,239 A | 7/2000 | Liu et al. |
| 6,103,096 A | 8/2000 | Datta et al. |
| 6,116,998 A | 9/2000 | Damgaard et al. |
| 6,132,292 A | 10/2000 | Kubo |
| 6,153,043 A | 11/2000 | Edelstein et al. |
| 6,156,124 A | 12/2000 | Tobin |
| 6,159,079 A | 12/2000 | Zuniga et al. |
| 6,171,467 B1 | 1/2001 | Weihs et al. |
| 6,176,992 B1 | 1/2001 | Talieh |
| 6,176,998 B1 | 1/2001 | Wardle et al. |
| 6,183,354 B1 | 2/2001 | Zuniga et al. |
| 6,190,494 B1 | 2/2001 | Dow |
| 6,210,257 B1 | 4/2001 | Carlson |
| 6,234,870 B1 | 5/2001 | Uzoh et al. |
| 6,238,271 B1 | 5/2001 | Cesna |
| 6,238,592 B1 | 5/2001 | Hardy et al. |
| 6,244,935 B1 | 6/2001 | Birang et al. |
| 6,248,222 B1 | 6/2001 | Wang |
| 6,251,235 B1 | 6/2001 | Talieh et al. |
| 6,257,953 B1 | 7/2001 | Gitis et al. |
| 6,258,223 B1 | 7/2001 | Cheung et al. |
| 6,261,168 B1 | 7/2001 | Jensen et al. |
| 6,261,959 B1 | 7/2001 | Travis et al. |
| 6,273,798 B1 | 8/2001 | Berman |
| 6,296,557 B1 | 10/2001 | Walker |
| 6,297,159 B1 | 10/2001 | Paton |
| 6,319,108 B1 | 11/2001 | Adefris et al. |
| 6,319,420 B1 | 11/2001 | Dow |
| 6,322,422 B1 | 11/2001 | Satou |
| 6,328,642 B1 | 12/2001 | Pant et al. |

| | | |
|---|---|---|
| 6,328,872 B1 | 12/2001 | Talieh et al. |
| 6,331,135 B1 | 12/2001 | Sabde et al. |
| 6,368,184 B1 | 4/2002 | Beckage |
| 6,368,190 B1 | 4/2002 | Easter et al. |
| 6,381,169 B1 | 4/2002 | Bocian et al. |
| 6,383,066 B1 | 5/2002 | Chen et al. |
| 6,386,956 B1 | 5/2002 | Sato et al. |
| 6,391,166 B1 | 5/2002 | Wang |
| 6,395,152 B1 | 5/2002 | Wang |
| 6,402,591 B1 | 6/2002 | Thornton |
| 6,406,363 B1 | 6/2002 | Xu et al. |
| 6,409,904 B1 | 6/2002 | Uzoh et al. |
| 6,413,388 B1 * | 7/2002 | Uzoh et al. ............ 204/224 R |
| 6,413,403 B1 | 7/2002 | Lindquist et al. |
| 6,428,394 B1 | 8/2002 | Mooring et al. |
| 6,431,968 B1 | 8/2002 | Chen et al. |
| 6,440,295 B1 | 8/2002 | Wang |
| 6,447,668 B1 | 9/2002 | Wang |
| 6,471,847 B2 | 10/2002 | Talieh et al. |
| 6,475,332 B1 | 11/2002 | Boyd et al. |
| 6,497,800 B1 | 12/2002 | Talieh et al. |
| 6,517,426 B2 | 2/2003 | Lee |
| 6,520,843 B1 | 2/2003 | Halley |
| 6,537,140 B1 | 3/2003 | Miller et al. |
| 6,537,144 B1 | 3/2003 | Tsai et al. |
| 6,551,179 B1 | 4/2003 | Halley |
| 6,561,873 B2 | 5/2003 | Tsai et al. |
| 6,561,889 B1 | 5/2003 | Xu et al. |
| 6,569,004 B1 | 5/2003 | Pham |
| 6,572,463 B1 | 6/2003 | Xu et al. |
| 6,585,579 B2 | 7/2003 | Jensen et al. |
| 6,630,059 B1 | 10/2003 | Uzoh et al. |
| 6,638,863 B2 | 10/2003 | Wang et al. |
| 6,641,471 B1 | 11/2003 | Pinheiro et al. |
| 6,656,019 B1 | 12/2003 | Chen et al. |
| 6,685,543 B2 * | 2/2004 | Lai et al. .................. 451/65 |
| 6,685,548 B2 | 2/2004 | Chen et al. |
| 6,692,338 B1 | 2/2004 | Kirchner |
| 6,726,823 B1 | 4/2004 | Wang et al. |
| 6,739,951 B2 | 5/2004 | Sun et al. |
| 6,752,700 B2 | 6/2004 | Duescher |
| 6,769,969 B1 | 8/2004 | Duescher |
| 6,776,693 B2 * | 8/2004 | Duboust et al. .............. 451/41 |
| 6,802,955 B2 | 10/2004 | Emesh et al. |
| 6,821,899 B2 * | 11/2004 | Lohokare et al. ........... 438/697 |
| 6,848,977 B1 | 2/2005 | Cook et al. |
| 6,856,761 B2 | 2/2005 | Doran |
| 6,962,524 B2 | 11/2005 | Butterfield et al. |
| 6,969,308 B2 * | 11/2005 | Doi et al. ................... 451/65 |
| 7,033,464 B2 * | 4/2006 | Emesh et al. .............. 204/198 |
| 2001/0005667 A1 | 6/2001 | Tolles et al. |
| 2001/0024878 A1 | 9/2001 | Nakamura |
| 2001/0027018 A1 | 10/2001 | Molnar |
| 2001/0035354 A1 | 11/2001 | Ashjaee et al. |
| 2001/0036746 A1 | 11/2001 | Sato et al. |
| 2001/0040100 A1 | 11/2001 | Wang |
| 2001/0042690 A1 | 11/2001 | Talieh |
| 2002/0008036 A1 | 1/2002 | Wang |
| 2002/0011417 A1 | 1/2002 | Talieh et al. |
| 2002/0020621 A1 | 2/2002 | Uzoh et al. |
| 2002/0025760 A1 | 2/2002 | Lee et al. |
| 2002/0025763 A1 | 2/2002 | Lee et al. |
| 2002/0070126 A1 | 6/2002 | Sato et al. |
| 2002/0077037 A1 | 6/2002 | Tietz |
| 2002/0088715 A1 | 7/2002 | Talieh et al. |
| 2002/0102853 A1 | 8/2002 | Li et al. |
| 2002/0108861 A1 | 8/2002 | Emesh et al. |
| 2002/0119286 A1 | 8/2002 | Chen et al. |
| 2002/0123300 A1 | 9/2002 | Jones et al. |
| 2002/0130049 A1 | 9/2002 | Chen et al. |
| 2002/0130634 A1 | 9/2002 | Ziemkowski et al. |
| 2002/0146963 A1 | 10/2002 | Teetzel |
| 2002/0148732 A1 | 10/2002 | Emesh et al. |
| 2002/0153097 A1 | 10/2002 | Basol et al. |
| 2003/0034131 A1 | 2/2003 | ParK et al. |
| 2003/0040188 A1 | 2/2003 | Hsu et al. |
| 2003/0114087 A1 | 6/2003 | Duboust et al. |
| 2003/0116444 A1 | 6/2003 | Basol |
| 2003/0116445 A1 | 6/2003 | Sun et al. |
| 2003/0116446 A1 | 6/2003 | Duboust et al. |
| 2003/0129927 A1 | 7/2003 | Lee et al. |
| 2003/0209448 A1 | 11/2003 | Hu et al. |
| 2003/0213703 A1 | 11/2003 | Wang et al. |
| 2003/0220053 A1 | 11/2003 | Manens et al. |
| 2004/0007478 A1 | 1/2004 | Basol et al. |
| 2004/0020788 A1 | 2/2004 | Mavliev et al. |
| 2004/0020789 A1 | 2/2004 | Hu |
| 2004/0023495 A1 | 2/2004 | Butterfield et al. |
| 2004/0023610 A1 | 2/2004 | Hu et al. |
| 2004/0053512 A1 | 3/2004 | Manens et al. |
| 2004/0082288 A1 | 4/2004 | Tietz et al. |
| 2004/0082289 A1 | 4/2004 | Butterfield et al. |
| 2004/0121708 A1 | 6/2004 | Hu et al. |
| 2004/0134792 A1 | 7/2004 | Butterfield et al. |
| 2004/0163946 A1 | 8/2004 | Chang et al. |
| 2004/0173461 A1 | 9/2004 | Tsai et al. |
| 2004/0266327 A1 | 12/2004 | Chen et al. |
| 2005/0000801 A1 | 1/2005 | Wang et al. |
| 2005/0016960 A1 | 1/2005 | Nogami et al. |
| 2005/0092621 A1 | 5/2005 | Hu et al. |
| 2005/0133363 A1 | 6/2005 | Hu et al. |
| 2005/0173260 A1 | 8/2005 | Basol et al. |
| 2005/0178666 A1 | 8/2005 | Tsai et al. |
| 2005/0194681 A1 | 9/2005 | Hu et al. |
| 2006/0006073 A1 * | 1/2006 | Basol et al. ................. 205/640 |
| 2006/0137819 A1 * | 6/2006 | Manens et al. ......... 156/345.12 |

FOREIGN PATENT DOCUMENTS

| | | |
|---|---|---|
| EP | 0 325 753 | 8/1989 |
| EP | 0 455 455 A2 | 11/1991 |
| EP | 1361023 | 11/2003 |
| JP | 58-171264 | 10/1983 |
| JP | 61-079666 | 4/1986 |
| JP | 61-265279 | 11/1986 |
| JP | 63-028512 | 2/1988 |
| JP | 05-277957 | 10/1993 |
| JP | 06-047678 | 2/1994 |
| JP | 10-006213 | 1/1998 |
| JP | 11-042554 | 2/1999 |
| JP | 11-329961 | 3/1999 |
| JP | 11-239961 | 7/1999 |
| JP | 2000-218513 | 8/2000 |
| JP | 11-216663 | 12/2000 |
| JP | 2001-77117 | 3/2001 |
| JP | 2001-179611 | 7/2001 |
| JP | 2001-244223 | 9/2001 |
| JP | 3453352 | 10/2003 |
| KR | 2003-037158 | 5/2003 |
| SU | 1618538 | 1/1991 |
| WO | WO 93/15879 | 8/1993 |
| WO | WO 98/49723 | 11/1998 |
| WO | WO 99/41434 | 8/1999 |
| WO | WO 99/53119 | 10/1999 |
| WO | WO 99/65072 | 12/1999 |
| WO | WO 00/03426 | 1/2000 |
| WO | WO 00/26443 | 5/2000 |
| WO | WO 00/33356 | 6/2000 |
| WO | WO 00/59682 | 10/2000 |
| WO | WO 00/71297 | 11/2000 |
| WO | WO 01/13416 | 2/2001 |
| WO | WO 01/49452 | 7/2001 |
| WO | WO 01/52307 | 7/2001 |
| WO | WO 01/63018 | 8/2001 |
| WO | WO 01/71066 | 9/2001 |
| WO | WO 01/88229 | 11/2001 |

| WO | WO 01/88954 | 11/2001 |
| WO | WO 02/23616 | 3/2002 |
| WO | WO 02/64314 | 8/2002 |
| WO | WO 02/75804 | 9/2002 |
| WO | WO 03/001581 | 1/2003 |
| WO | WO 03/099519 A1 | 12/2003 |
| WO | WO 2004/073926 A1 | 9/2004 |

OTHER PUBLICATIONS

PCT International Search Report and Written Opinion for PCT/US2006/004114, dated Jul. 14, 2006.
Notification of Transmittal of the International Search Report and Written Opinion dated Nov. 7, 2005.
European Search Report dated Sep. 27, 2005 for Application No. 03254807.5.
Alexander, Jr., "Electrically Conductive Polymer Nanocomposite Materials", http://www.afrlhorizons.com/Briefs/Sept02/ML0206.html printed Feb. 19, 2003.
Contolini, "Electrochemical Planarization of ULSI Copper," Solid State Technology, vol. 40, No. 6, Jun. 1, 1997.
Nogami, "An Innovation in Integrate Porous Low-K Materials and Copper," InterConnect Japan 2001; Honeywell Seminar December 6, 2001, p. 1-12.
Partial International Search / PCT Invitation to pay additional fees dated Nov. 14, 2002 (4100 PC 02).
Notification regarding review of justification for invitation to pay additional fees for PCT/US/02/11009 (4100 PC 02) dated Feb. 25, 2003.
International Search Report for PCT/US 02/11009 (4100 EP 02) dated Feb. 25, 2003.
PCT Written Opinion dated Apr. 1, 2003 for PCT/US02/11009. (4100 EP 02).
Notification of Transmittal of International Preliminary Examination Report dated Nov. 10, 2003 (4100 EP 02).
European Search Report for 03252801.0, dated Jan. 16, 2004 (7047 EP).
Communication pursuant to Article 96(2) EPC for Application No. 02728965.4, dated Jun. 11, 2004 (4100 EP 02).

Search Report issued by the Austrian Patent Office for corresponding Singapore Patent Application No. 200302562-4, provided by letter dated Oct. 7, 2004.
Invitation to pay additional fees dated Nov. 11, 2004 (4100 P5 PCT).
Notification of Transmittal of International Preliminary Examination Report and Written Opinion dated Feb. 21, 2005 (4100 PCT).
Notification of transmittal of the International Search report and Written Opinion dated Mar. 14, 2005 (4100 P5 PCT).
PCT International Search Report and Written Opinion dated Apr. 28, 2005 for PCT/US04/037870.

* cited by examiner

*Primary Examiner*—Eileen P. Morgan
(74) *Attorney, Agent, or Firm*—Patterson & Sheridan

(57) ABSTRACT

A method and apparatus for the removal of a deposited conductive layer along an edge of a substrate using an electrode configured to electro polish a substrate edge are disclosed. The electro polishing of the substrate edge may occur simultaneously during electrochemical mechanical processing (Ecmp) of a substrate face. In one embodiment, a power source applies a bias between the substrate and at least two electrodes. The electrodes form a first electrode zone proximate the substrate edge at a sufficient potential to electro polish the substrate edge, thereby removing the conductive layer from the substrate edge. A second electrode zone with a lower potential than the first electrode zone is aligned proximate the substrate face during processing to enable Ecmp of the substrate face.

17 Claims, 5 Drawing Sheets

EDGE BEAD REMOVAL BY AN ELECTRO POLISHING PROCESS

CROSS-REFERENCE TO RELATED APPLICATIONS

This application claims benefit of U.S. Provisional Application Ser. No. 60/579,098, filed Jun. 11, 2004, and is a continuation-in-part of U.S. patent application Ser. No. 10/727,724, filed Dec. 3, 2003 now U.S. Pat No. 7,077,721, which is a continuation-in-part of U.S. patent application Ser. No. 10/642,128, filed Aug. 15, 2003 now U.S. Pat. No. 6,962,524 (hereinafter the '128 application). The '128 application is a continuation-in-part of U.S. patent application Ser. No. 10/608,513, filed Jun. 26, 2003 (hereinafter the '513 application), which is a continuation-in-part of U.S. patent application Ser. No. 10/140,010, filed May 7, 2002 now U.S. Pat. No. 6,979,248. The '513 application is also a continuation-in-part of co-pending U.S. patent application Ser. No. 10/211,626, filed Aug. 2, 2002, which is a continuation-in-part of U.S. patent application Ser. No. 10/033,732, filed Dec. 27, 2001 now U.S. Pat. No. 7,066,800, which is a continuation-in-part of U.S. patent application Ser. No. 09/505,899, filed Feb. 17, 2000, now U.S. Pat. No. 6,537,144. The '513 application is additionally a continuation-in-part of U.S. patent application Ser. No. 10/210,972, filed Aug. 2, 2002, which is also a continuation-in-part of U.S. patent application Ser. No. 09/505,899, filed Feb. 17, 2000, now U.S. Pat. No. 6,537,144. The '513 application is further a continuation-in-part of U.S. patent application Ser. No. 10/151,538, filed May 16, 2002 now abandoned. The '128 application is also a continuation-in-part of U.S. patent application Ser. No. 10/244,697, filed Sep. 16, 2002 now U.S. Pat. No. 6,991,526, which is a continuation-in-part of U.S. application Ser. No. 10/244,688, filed Sep. 16, 2002, now U.S. Pat. No. 6,848,970, and of U.S. patent application Ser. No. 10/391,324, filed Mar. 18, 2003. All of the above referenced applications are hereby incorporated by reference in their entireties.

BACKGROUND OF THE INVENTION

1. Field of the Invention

Embodiments of the invention generally relate to removal of a deposited conductive layer along an edge of a substrate. More particularly, embodiments of the invention relate to an electrode configured to polish a substrate edge during electrochemical mechanical processing of a substrate face.

2. Description of the Related Art

In the fabrication of integrated circuits (IC) and other electronic devices, deposition of a conductive layer on a substrate, such as a copper layer used to fill features formed within a dielectric material, results in excess copper deposited on a face of the substrate and a peripheral edge of the substrate that wraps onto the face. The excess copper on the face can cause problems such as shorts in the circuit. Additionally, the excess copper extending onto the edge of the substrate can lead to delamination of the copper layer and other problems even if the edge portion is part of an unusable section of the substrate. Therefore, the excess copper must be removed from both the edge and the face of the substrate prior to subsequent processing of the substrate, which may include the addition and removal of additional layers of conducting, semiconducting, and dielectric materials in order to form multilevel interconnects of the integrated circuit.

Electrochemical Mechanical Processing (Ecmp) provides one technique used to remove the excess copper from the face of the substrate surface by electrochemical dissolution while concurrently polishing the substrate with reduced mechanical abrasion as compared to conventional Chemical Mechanical Polishing (CMP) processes. Electrochemical dissolution is performed by applying a bias between a cathode and the substrate surface to remove the copper from the substrate surface into a surrounding electrolyte. The bias may be applied to the substrate surface by a conductive contact disposed on or through a polishing material upon which the substrate is processed. The mechanical component of the Ecmp polishing process is provided by a relative motion between the substrate and the polishing material that enhances the removal of the copper from the substrate. Direct contact between the substrate and the polishing material removes a passivation layer protecting the copper, thereby enabling the polishing and planarization via Ecmp.

Conventional CMP effectively only removes the excess copper on the face of the substrate and not the edge of the substrate since the polishing material does not contact the edge of the substrate. Therefore, an edge bead removal (EBR) step is currently required between the deposition step and the conventional CMP process. The EBR may occur within the same system used for deposition and includes the additional time consuming process of spinning the substrate as a nozzle directs an etching solution onto the excess copper along the edge of the substrate. The nozzle for the EBR requires adjustments and tuning in order to attempt to selectively direct the etching solution at only the desired edge portion of the substrate. Thus, the additional EBR step in the IC manufacturing increases costs by slowing throughput, increasing the overall complexity of the system used for deposition, and requiring use of additional consumable material.

Therefore, there exists a need for an improved method and apparatus for removal of a deposited conductive layer along an edge of a substrate.

SUMMARY OF THE INVENTION

The invention generally relates to methods and apparatus for removal of a deposited conductive layer along an edge of a substrate using an electrode configured to electro polish a substrate edge. The electro polishing of the substrate edge may occur simultaneously during electrochemical mechanical processing (Ecmp) of a substrate face. In one embodiment, a power source applies a bias between the substrate and at least two electrodes. The electrodes form a first electrode zone proximate the substrate edge at a sufficient potential to electro polish the substrate edge, thereby removing the conductive layer from the substrate edge. A second electrode zone with a lower potential than the first electrode zone is aligned proximate the substrate face during processing to enable Ecmp of the substrate face.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The invention generally relates to the edge bead removal (EBR) from a substrate by an electro polishing process. The electro polishing process may occur simultaneously during electrochemical mechanical processing (Ecmp) of the substrate using one or more electrodes positioned proximate to the edge of the substrate and having a sufficient potential to selectively electro polish the edge. While an exemplary Ecmp station will be described herein for utilizing the electrode to electro polish the edge, it is contemplated that that the electrode may be utilized without a polishing pad in stations other than an Ecmp platen in order to electro polish the edge of the substrate. Further, any Ecmp platen and polishing pad may be utilized for polishing the substrate when the electrode is part of an Ecmp station. For example, other Ecmp stations may use different carrier heads and/or different platen assemblies than those described herein without departing from the scope of the invention.

Figure 1:
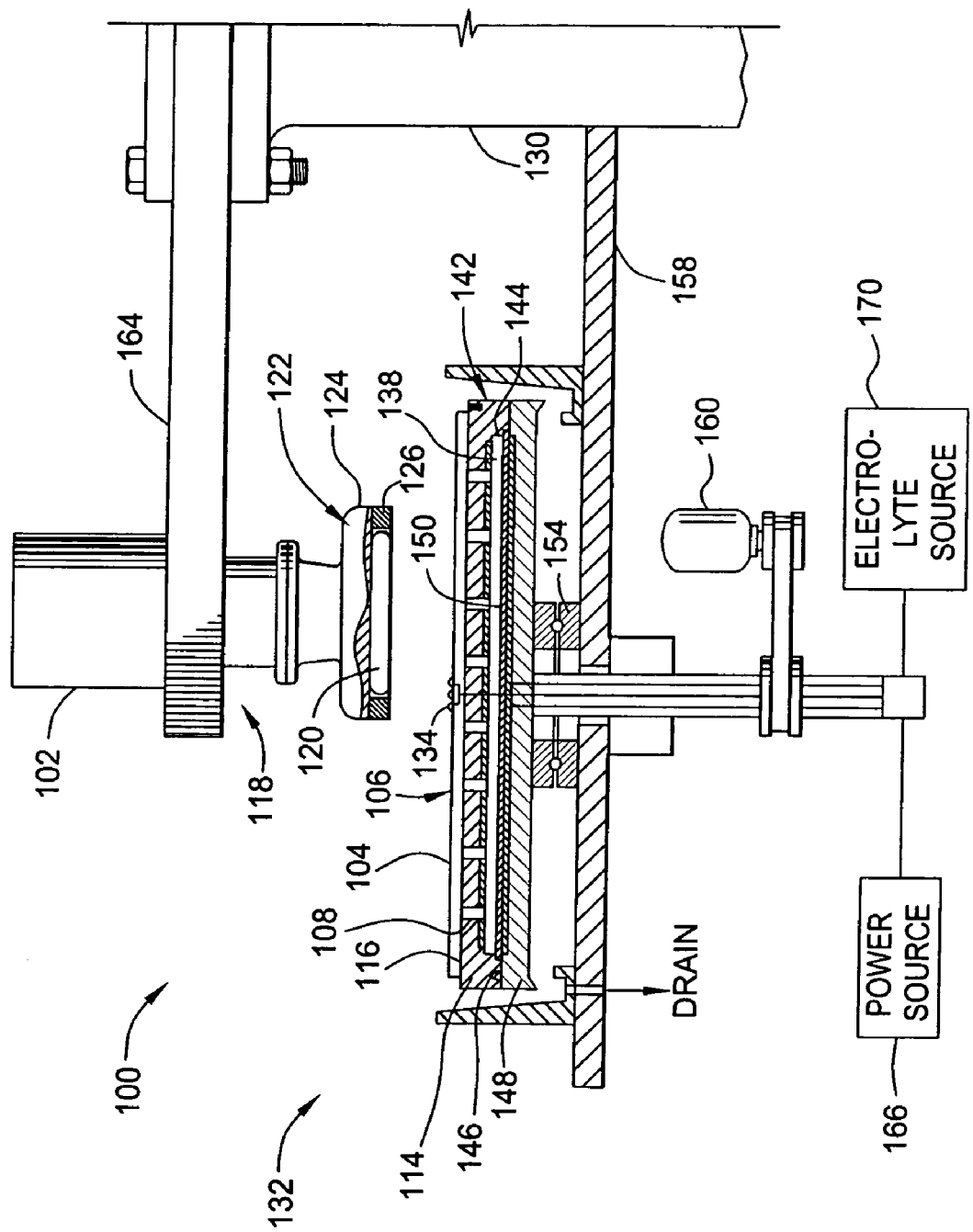
FIG. 1 is a side view, partially in cross-section, of a processing station of an electrochemical mechanical processing (Ecmp) system.

FIG. 1 depicts a partial sectional view of an exemplary processing station 100 employing one embodiment of a polishing pad assembly 106 capable of removing an edge bead from a substrate 120. The processing station 100 includes a carrier head assembly 118 adapted to hold the substrate 120 against a platen assembly 142 disposed in an Ecmp platen 132. Relative motion provided between the substrate 120 and the platen assembly 142 polishes the substrate 120. The relative motion may be rotational, lateral, or some combination thereof and may be provided by either or both of the carrier head assembly 118 and the platen assembly 142. An arm 164 coupled to a base 130 supports the carrier head assembly 118 over the Ecmp platen 132.

The carrier head assembly 118 generally includes a drive system 102 coupled to a carrier head 122 for providing at least rotational motion to the carrier head 122. The carrier head 122 additionally may actuate toward the Ecmp platen 132 such that the substrate 120 retained in the carrier head 122 disposes against a processing surface 104 of the Ecmp platen 132 during processing. The carrier head 122 includes a housing 124 and a retaining ring 126 that define a center recess, which retains the substrate 120. The carrier head 122 may be a TITAN HEAD™ or TITAN PROFILER™ wafer carrier manufactured by Applied Materials, Inc., of Santa Clara, Calif.

The Ecmp platen 132 generally includes the platen assembly 142 having an upper platen 114 and a lower platen 148 rotationally disposed on a base 158. A bearing 154 between the platen assembly 142 and the base 158 facilitates rotation of the platen assembly 142 relative to the base 158. A motor 160 provides the rotational motion to the platen assembly 142. A top surface 116 of the upper platen 114 supports the polishing pad assembly 106 thereon. The lower platen 148 couples to the upper platen 114 by any conventional coupling, such as a plurality of fasteners (not shown). A plurality of locating pins 146 (one is shown in FIG. 1) disposed between the upper and lower platens 114, 148 ensure alignment therebetween. The upper platen 114 and the lower platen 148 may optionally be fabricated from a single, unitary member.

A plenum 138 defined in the platen assembly 142 may be partially formed in at least one of the upper or lower platens 114, 148. In the embodiment depicted in FIG. 1, a recess 144 partially formed in the lower surface of the upper platen 114 defines the plenum 138. At least one hole 108 formed in the upper platen 114 allows electrolyte provided to the plenum 138 from an electrolyte source 170 to flow through the platen assembly 142 and into contact with the substrate 120 during processing. A cover 150 coupled to the upper platen 114 encloses the recess 144 and partially bounds the plenum 138. Alternatively, a pipe (not shown) may dispense the electrolyte onto the top surface of the polishing pad assembly 106.

At least one contact assembly 134 is disposed on the platen assembly 142 along with the polishing pad assembly 106. The at least one contact assembly 134 extends at least to or beyond the upper surface of the polishing pad assembly 106 and is adapted to electrically couple the substrate 120 to a power source 166. Counter electrodes (described below) of the polishing pad assembly 106 couple to different terminals of the power source 166 so that an electrical potential may be established between the substrate 120 and the counter electrodes. In other words, the contact assembly 134 biases the substrate 120 by electrically coupling the substrate 120 to one terminal of the power source 166 during processing while the substrate 120 is held against the polishing pad assembly 106. The polishing pad assembly 106 couples to another terminal of the power source 166. The electrolyte, which is introduced from the electrolyte source 170 and is disposed into the Ecmp platen, completes an electrical circuit between the substrate 120 and the counter electrodes. The electrically conductive electrolyte assists in the removal of material from the surface and edge of the substrate 120.

Figure 2:
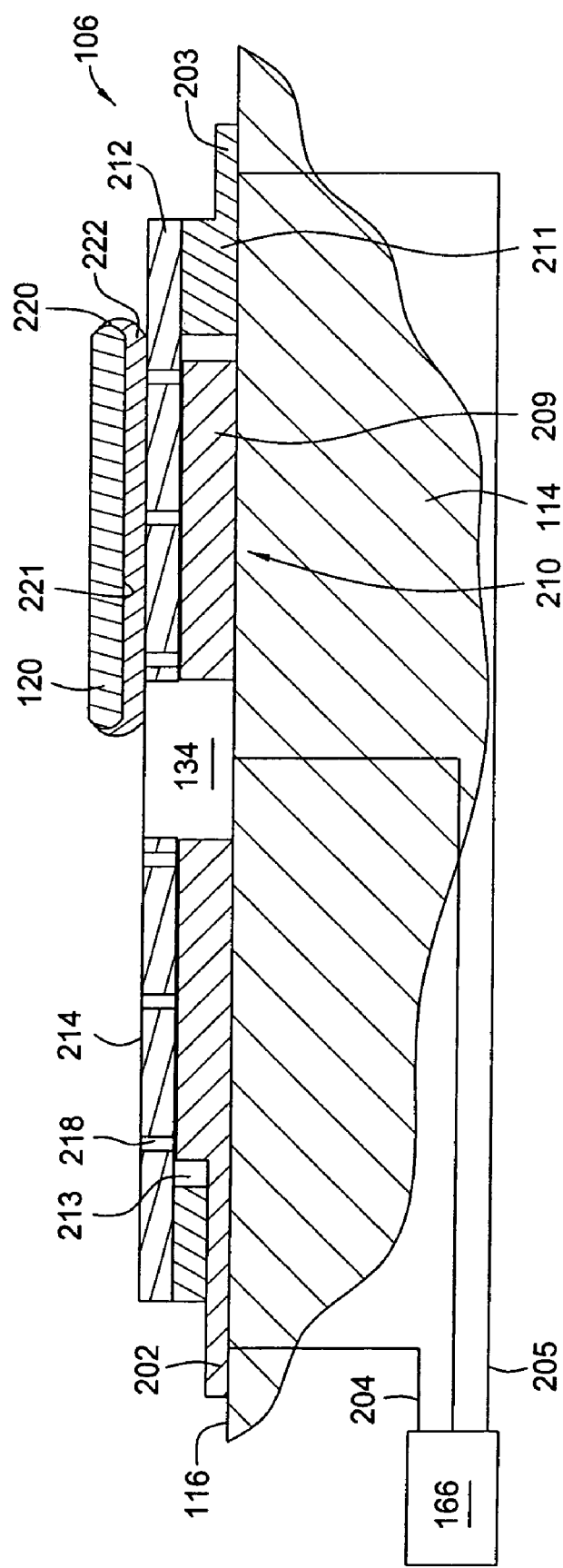
FIG. 2 is a partial sectional view of one embodiment of a polishing pad assembly illustrating a two zone counter electrode configuration capable of removing copper from an edge of a substrate.

FIG. 2 depicts a partial sectional view of the polishing pad assembly 106 and the platen assembly 142 of FIG. 1. The polishing pad assembly 106 includes at least a conductive layer 210 and an upper layer 212 having a processing surface 214. In one embodiment, at least one permeable passage 218 disposed at least through the upper layer 212 extends at least to the conductive layer 210 in order to allow the electrolyte to establish a conductive path between the substrate 120 and the conductive layer 210. For some embodiments, there are thousands of passages 218. Some of the passages 218 may be needed to polish the face of the substrate 120 while others are may be used to polish the edge of the substrate. Accordingly, FIG. 2 schematically depicts only a few of the passages 218, which are preferably more numerous than shown. The use of adhesives, bonding, compression molding, or the like may combine the conductive layer 210 and upper layer 212 of the polishing pad assembly 106 into a unitary assembly. Examples of polishing pad assemblies that may be adapted to benefit from the invention are described in U.S. patent application Ser. No. 10/455,941, filed Jun. 6, 2003 by Y. Hu et al. (entitled "CONDUCTIVE POLISHING ARTICLE FOR ELECTROCHEMICAL MECHANICAL POLISHING") and U.S. patent application Ser. No. 10/455, 895, filed Jun. 6, 2003 by Y. Hu et al. (entitled "CONDUCTIVE POLISHING ARTICLE FOR ELECTROCHEMICAL MECHANICAL POLISHING"), both of which are hereby incorporated by reference in their entireties.

The conductive layer 210 typically includes a corrosion resistant conductive material, such as metals, conductive alloys, metal coated fabrics, conductive polymers, conductive pads, and the like. Conductive metals include Sn, Ni, Cu, Au, and the like. Conductive metals also include a corrosion resistant metal such as Sn, Ni, or Au coated over an active metal such as Cu, Zn, Al, and the like. Conductive alloys include inorganic alloys and metal alloys such as bronze, brass, stainless steel, or palladium-tin alloys, among others. Magnetic attraction, static attraction, vacuum, adhesives, or the like holds the conductive layer 210 on the top surface 116 of the upper platen 114 of the platen assembly 142. Other layers, such as release films, liners, and other adhesive layers, may be disposed between the conductive layer 210 and the upper platen 114 to facilitate ease of handling, insertion, and removal of the polishing pad assembly 106 in the processing station 100.

The conductive layer 210 includes at least an inner counter electrode 209 and an outer counter electrode 211 that are separated from one another by a gap 213 or other dielectric spacer. A first terminal 202 facilitates coupling of the inner electrode 209 to the power source 166, and a second terminal 203 facilitates coupling of the outer electrode 211 to the power source 166. For example, stainless steel screws (not shown) respectively secure leads 204, 205 of the power source 166 with the terminals 202, 203. The power source 166 supplies a first voltage to the outer electrode 211 that is higher than a second voltage supplied to the inner electrode 209. Thus, the conductive layer 210 comprises at least two independent electrode zones defined by the electrodes 209, 211 and isolated from each other. The conductive layer 210 should also be fabricated of a material compatible with electrolyte chemistries to minimize crosstalk between zones of the electrodes 209, 211. For example, metals stable in the electrolyte chemistries are able to minimize zone cross-talk.

The outer electrode 211 substantially circumscribes an outer perimeter of the polishing pad assembly 106 such that the zone of the outer electrode 211 extends at least to an edge 220 of the substrate 120 as the substrate 120 and the platen assembly 142 move relative to each other. The zone of the inner electrode 209 extends across an area corresponding to a face 221 of the substrate 120 as the substrate 120 and the platen assembly 142 move relative to each other. Proximity of the outer electrode 211 with respect to the edge 220 and the inner electrode 209 with respect to the face 221 ensures that the zones of the electrodes 209, 211 extend to the appropriate portions of the substrate 120. During Ecmp, the zones of each of the electrodes 209, 211 substantially remain proximate the edge 220 and the face 221 of the substrate 120, respectively. The head may sweep such that sometimes the edge 220 is in proximity of the inner counter electrode 209.

In operation, the first voltage applied to the inner electrode results in the typical Ecmp process of the face 221 of the substrate 120 due to a combination of electrochemical dissolution and abrasion from direct contact of a copper layer 222 with the processing surface 214. The contact between the copper layer 222 and the processing surface 214 removes a passivation layer from the copper layer 222 and enables polishing and planarization of the face 221. As shown in FIG. 2, the copper layer 222 extends onto the edge 220 of the substrate 120 and has not been removed in a separate edge bead removal (EBR) step prior to the Ecmp polishing of the substrate 120. However, Ecmp may not remove the copper layer 222 around the edge 220 since the copper layer 222 around the edge 220 lacks contact with the processing surface 214.

In a particularly advantageous aspect of the invention, the high voltage difference between the outer electrode 211 and the substrate 120 removes the copper layer 222 along the edge 220 of the substrate 120 during Ecmp without requiring the separate EBR step. The power source 166 supplies the second voltage to the outer electrode 211 such that the voltage difference between the outer electrode 211 and the substrate 120 is sufficient to remove the copper layer 222 under the action of the bias without requiring any abrasion from the processing surface 214. While the passivation layer protects the copper layer 222 from the voltage difference between the substrate 120 and the inner electrode 209 at the first voltage, the passivation layer does not protect the copper layer 222 from the high voltage difference between the substrate 120 and the outer electrode 211 at the second voltage. Thus, the second voltage supplied to the outer electrode 211 enables removal or polishing of the copper layer 222 around the edge 220 of the substrate 120 via an electro polishing process. Control of the copper layer 222 removal from the edge 220 of the substrate 120 simply requires adjusting the voltage supplied to the outer electrode 211.

The outer electrode 211 selectively removes the copper layer 222 from the edge 220 of the substrate 120 and possibly a small perimeter of the face 221 adjacent the edge 220 since the outer electrode 211 only faces or is proximate the edge 220. Therefore, the outer electrode 211 only electro polishes the edge 220 while the remainder of the substrate 120 facing or proximate the inner electrode 209 is polished via the Ecmp technique. The amount of the copper layer 222 removed around the perimeter of the face 221 depends on the level of the second voltage of the outer electrode 211 and the proximity of the outer electrode 211 to the perimeter of the face 221. The electro polishing of the edge 220 may occur simultaneously with Ecmp of the face 221 such that removal of the copper layer 222 from the edge 220 does not affect throughput during processing of the substrate 120.

The voltage supplied to the inner electrode 209 depends on the working range of the Ecmp system and chemistry used therewith in order to obtain the required Ecmp performance such as rate, polishing profile, planarization, defects and surface roughness. To permit the Ecmp polishing of the face 221 of the substrate 120, the power source 166 preferably supplies a positive bias of approximately zero volts (V) (usually grounded) to the substrate 120 and supplies the first voltage to the inner electrode 209 at preferably from zero V to approximately −5 V, most preferably approximately −2 V or −3 V. The power source 166 supplies the second voltage to the outer electrode 211 at a sufficient voltage to electro polish the copper layer 222. Therefore, the power source 166 preferably supplies the second voltage to the outer electrode 211 at preferably −4 V to −20 V, most preferably approximately −10 V.

While a minimum of two separate electrode zones are required to provide the separate electro polishing and Ecmp of the substrate as described herein, additional electrodes providing additional zones may be utilized to tailor Ecmp performance to obtain good uniformity across the face 221 of the substrate 120. Preferably, the number of zones varies from 3 to 5 with the outermost zone dedicated to electro polishing the copper layer 222 from the edge 220 such as provided by the outer electrode 211.

Figure 3:
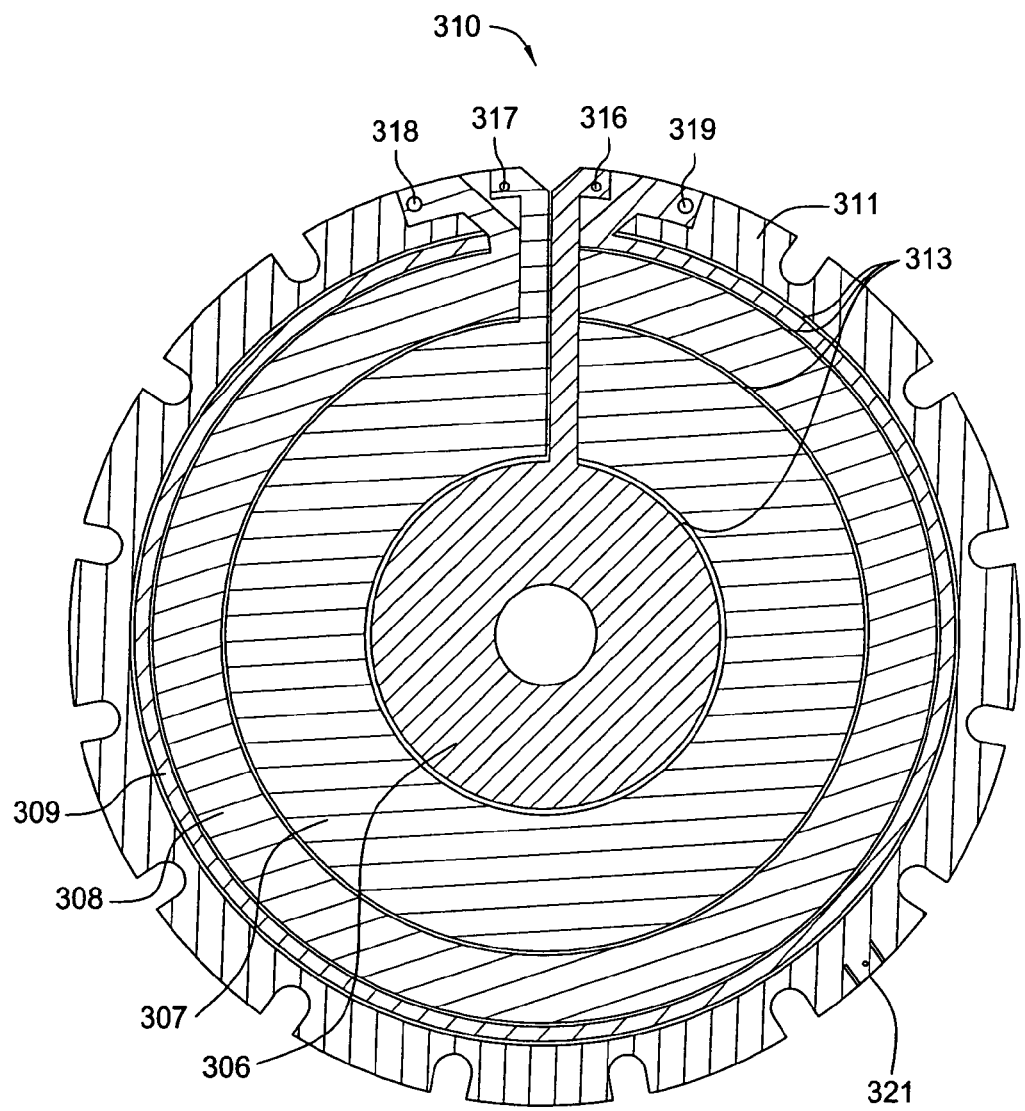
FIG. 3 is a bottom view of a five zone counter electrode used in an Ecmp system that can simultaneously polish a face of the substrate as well as the edge of the substrate thus eliminating the need for a conventional edge bead removal step.
Figure 4:
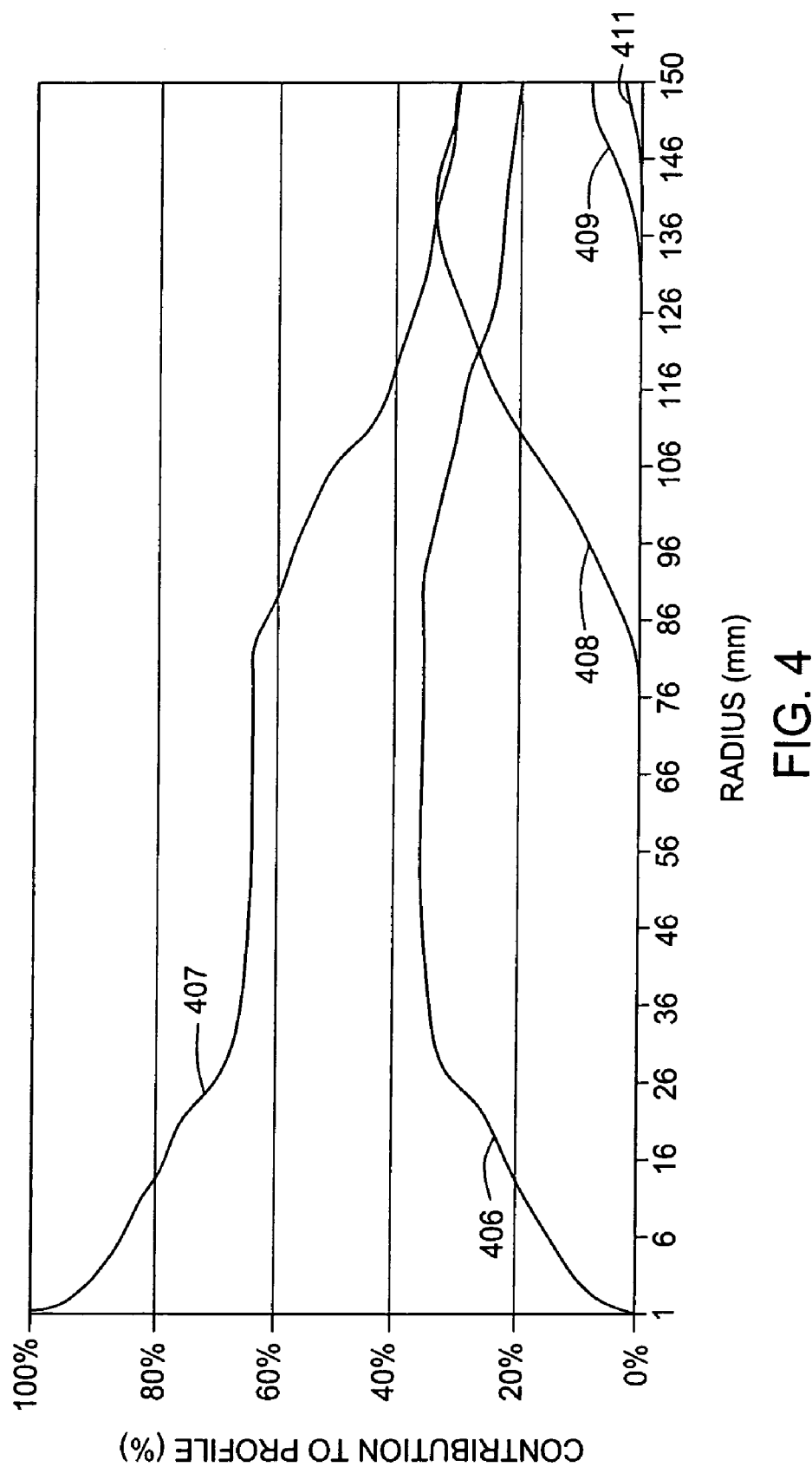
FIG. 4 is a graph illustrating the contribution of each zone of the counter electrode (as described in FIG. 3) on the polishing profile and the edge of the substrate.

FIG. 3 shows a bottom view of a five zone conductive layer 310 for use in an Ecmp platen that provides simultaneous polishing of the substrate and the edge bead removal. The conductive layer 310 includes five electrodes 306, 307, 308, 309, 311 that provide the five zones. A gap 313 separates the electrodes 306, 307, 308, 309, 311, which each include respective terminals 316, 317, 318, 319, 321 for coupling to a power source. The gap 313, typically 1.0 to 2.0 millimeters, minimizes cross talk between the zones. FIG. 4 shows a graph illustrating an affect that each zone from the electrodes 306, 307, 308, 309, 311 has in contributing to a profile of a substrate at locations along its radius. Curves 406, 407, 408, 409, 411 respectively represent the percentage that the electrodes 306, 307, 308, 309, 311 affect the profile. As shown by the curve 411, the zone formed by an outer one of the electrodes only removes copper from the edge of the substrate. Due to the relative movement between the substrate and the conductive layer 310 during processing, the zone formed by the electrode adjacent the outer electrode may also remove copper from the edge of the substrate. Therefore, the bias of the outer electrode and optionally the electrode adjacent the outer electrode provide a sufficiently high voltage difference with respect to the substrate to remove copper via electro polishing while the bias of the remaining electrodes enable Ecmp.

Figure 5:
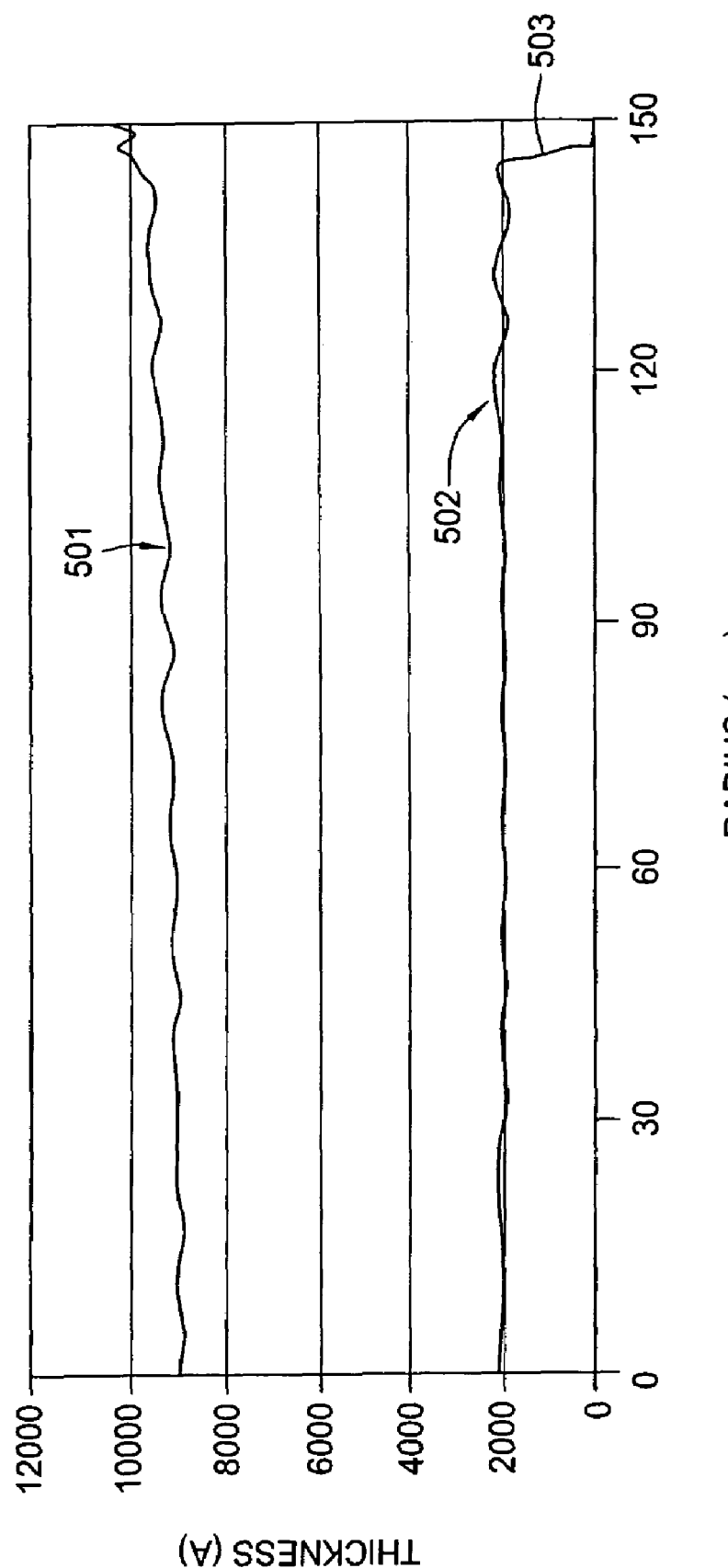
FIG. 5 is a graph illustrating copper thickness on a substrate before and after Ecmp using an electrode to provide edge bead removal via electro polishing.

FIG. 5 shows a graph illustrating copper thickness on a substrate directly before Ecmp as indicated by curve 501 and after Ecmp as indicated by curve 502 using at least two electrode zones to provide edge bead removal via electro polishing while enabling Ecmp of the face of the substrate. As shown in the curve 501, the thickness at the edge of the wafer (e.g., corresponding to a radius of 146-150 mm) demonstrates that the edge bead has not been removed prior to Ecmp in an edge bead removal step since the thickness does not go to zero at the outer radius. The curve 502 shows the face (e.g., corresponding to a radius between zero and 146 mm) having been polished via Ecmp. The curve 502 further illustrates at point 503 the affect of electro polishing the conductive layer from the edge since the thickness at this point goes to zero.

While the foregoing is directed to embodiments of the invention, other and further embodiments of the invention may be devised without departing from the basic scope thereof, and the scope thereof is determined by the claims that follow.

The invention claimed is:

1. A method of processing a substrate, comprising:
   contacting the substrate with a polishing pad assembly comprising at least two electrodes;
   electrically biasing a first electrode of the polishing pad assembly to form a first electrode zone facing a face of the substrate at a first voltage potential selected to perform the electrochemical mechanical processing (Ecmp) of the face;
   electrically biasing a second electrode of the polishing pad to form a second electrode zone facing an edge of the substrate at a second voltage potential selected to perform simultaneous
   electro polishing of the edge of the substrate during the Ecmp, wherein the second voltage potential is higher than the first voltage potential.

2. The method of claim 1, wherein different voltage potentials applied to the at least two electrodes and location of the electrodes determine where on the substrate Ecmp and electro polishing occur.

3. The method of claim 1, further comprising adjusting a voltage potential applied to the first electrode facing the edge of the substrate to control the electro polishing of the edge.

4. The method of claim 1, wherein the first and second electrode zones are formed by at least two concentric electrodes.

5. The method of claim 1, wherein the first electrode zone is formed by an inner electrode disposed proximate the face of the substrate.

6. The method of claim 1, wherein the second electrode zone is formed by an outer electrode disposed proximate an edge of the substrate.

7. The method of claim 1, wherein a voltage difference between the substrate and the first electrode zone is less than 5 volts.

8. The method of claim 1, wherein a voltage difference between the substrate and the second electrode zone is between 4 and 20 volts.

9. The method of claim 1, further comprising providing a predetermined polishing profile by forming an additional electrode zone facing the face of the substrate.

10. A method of processing a substrate, comprising:
    contacting the substrate with a polishing pad assembly comprising an inner electrode and an outer electrode;
    applying a first voltage to the inner electrode, wherein the inner electrode is disposed proximate a face of the substrate;
    electrochemical mechanical processing the face of the substrate; and
    applying a second voltage to an outer electrode disposed proximate an edge of the substrate, wherein the second voltage is higher than the first voltage and is capable of electropolishing the edge of the substrate.

11. The method of claim 10, comprising adjusting the second voltage to control electropolishing of the edge of the substrate.

12. The method of claim 11, wherein a difference between the voltage and the first counter voltage is less than 5 volts.

13. The method of claim 11, wherein a difference between the voltage and the second counter voltage is between 4 and 20 volts.

14. The method of claim 11, wherein the Ecmp includes rotating a polishing surface that is in contact with the substrate.

15. The method of claim 11, wherein the Ecmp includes moving the substrate relative to a polishing surface in contact with the substrate.

16. The method of claim 11, wherein the first and second electrodes form two concentric electrode zones.

17. The method of claim 11, further comprising removing a portion of a deposited conductive layer along an edge of the substrate at a higher removal rate than a portion of the conductive layer covering the face of the substrate.

* * * * *

UNITED STATES PATENT AND TRADEMARK OFFICE
CERTIFICATE OF CORRECTION

PATENT NO.        : 7,303,462 B2
APPLICATION NO.   : 11/087878
DATED             : December 4, 2007
INVENTOR(S)       : Alain Duboust, Antoine P. Manens and Liang-Yuh Chen It is certified that error appears in the above-identified patent and that said Letters Patent is hereby corrected as shown below:

Title page item (56):

Col. 3, line 11, delete "2,457,510 A 12/1948 van Omum" and insert --2,457,510 A 12/1948 Van Ornum--;

Page 2, line 11, delete "2,549,678 A 4/1951 Flandt" and insert --2,549,678 A 4/1951 Fiandt--;

Page 2, line 26, delete "2,658,264 A 10/1953 Toulmin" and insert --2,656,284 A 9/1949 Toulmin--.

Signed and Sealed this

Fourteenth Day of September, 2010

David J. Kappos
*Director of the United States Patent and Trademark Office*